Aug. 30, 1949.  J. E. WHITFIELD  2,480,818
HELICAL ROTARY FLUID HANDLING DEVICE
Filed May 11, 1943  5 Sheets-Sheet 2

INVENTOR.
Joseph E. Whitfield,
BY
his attorney

Aug. 30, 1949.   J. E. WHITFIELD   2,480,818
HELICAL ROTARY FLUID HANDLING DEVICE
Filed May 11, 1943                      5 Sheets-Sheet 3

INVENTOR.
Joseph E. Whitfield
BY Edward R. Laurence
his attorney

Aug. 30, 1949.  J. E. WHITFIELD  2,480,818
HELICAL ROTARY FLUID HANDLING DEVICE
Filed May 11, 1943  5 Sheets-Sheet 5

INVENTOR.
Joseph E. Whitfield
BY
his attorney

Patented Aug. 30, 1949

2,480,818

UNITED STATES PATENT OFFICE 2,480,818

HELICAL ROTARY FLUID HANDLING DEVICE

Joseph E. Whitfield, Hamilton, Ohio

Application May 11, 1943, Serial No. 486,520

15 Claims. (Cl. 103—128)

This invention relates generally to fluid pumps, motors, blowers, compressors and similar devices in which the rotary engaging members are provided with helical intermeshing threads, and more particularly to the housing which encloses and cooperates with the rotary members to produce a fluid device having definite operating characteristics; and the method of operating the same.

These screw type fluid devices have two or more members rotatably supported with their axes parallel and having complementary intermeshing helical threads and grooves preferably of such shape to provide a continuous seal line therebetween, and which cooperate with the walls of the chambers in which they rotate to form fluid pockets that advance from one end of the chambers to the other. When operating as a motor the fluid pressure on the surfaces of the rotary members propels them, but when operating as a pump, blower or compressor the fluid is propelled by the rotation of the intermeshing members.

The screw members have complementary threads and grooves. The male member is referred to as the rotor and its threads are preferably all or full addendum with the pitch circle being less than the root diameter. The female member is referred to as the gate and its complementary threads are all or full dedendum, the pitch circle being greater than its outside diameter. These complementary intermeshing helical threads preferably form a continuous seal with each other since the curved sides of the helical rotor threads are generated or described by the continuous crest edges of the helical threads of the gate, and the curved troughs of the gate are generated or described by the continuous crest edges of the helical threads of the rotor. These rotary members are shown and described in Letters Patent No. 2,287,716.

The intermeshing rotary members operate in parallel cylindrical chambers which merge into one another, forming a larger chamber, the cross section of which is somewhat in the form of a figure 8. Theoretically, the rotary members form a continuous seal with each other and their peripheral surfaces seal with the walls of their respective chambers. Actually it is necessary that they have a running clearance to prevent actual contact. The clearance provided depends on the dimensions of the apparatus. However it does provide an effective practical seal and the rotary members are maintained in their proper phase relation by timing gears although they are capable of driving one another.

The ports are located at diagonal corners of the housing or case and extend over a portion of the ends and sides of the two chambers in the vicinity where they merge. If the ports are the same at each end the direction of rotation of the members determines which is the inlet or outlet. However the performance characteristics of this fluid device depends principally upon the size and speed of the rotary members together with the extent of the outlet port which is the main feature of this invention.

When this type of fluid device is employed as a blower a certain amount of noise is produced by the air being discharged. This is especially true when the discharge is directed against a pressure. The transverse flow blower known in the art produces more noise than the axial flow blower of the type disclosed herein. However noise is objectionable not only from the audio standpoint but because it indicates lower efficiency.

The principal object of this invention is the provision of a housing for a fluid device having a port arrangement that materially decreases the noise created by the movement of fluid therethrough.

Another object is the provision of a housing for an axial flow fluid device having a port arrangement that closes the successively formed pockets to the inlet and opens them to the outlet simultaneously without any decrease in volume but restricts the flow of fluid to raise the pressure of the discharged fluid.

Another object is the provision of a fluid device having a restricted outlet of gradually increasing volume.

Another object is the provision of a fluid device having an adjustably restricted outlet.

Another object is the provision of a fluid device having a restricted outlet extending from the maximum ultimate port outline that partially discharges the fluid from the pockets before they are diminished in volume.

Another object is the provision of a fluid device having a discharge port that produces predetermined flow and pressure characteristics relative to speed of operation of the device.

Another object is the provision of a fluid device having a discharge port which gradually opens.

Another object is the provision of a fluid device having a restricted discharge port permitting the flow of fluid in either direction therethrough depending upon the pressure and speed of the device.

Other objects and advantages appear in the following description and claims.

Practical embodiments illustrating the principles of this invention are shown in the accompanying drawings wherein.

Figure 1:
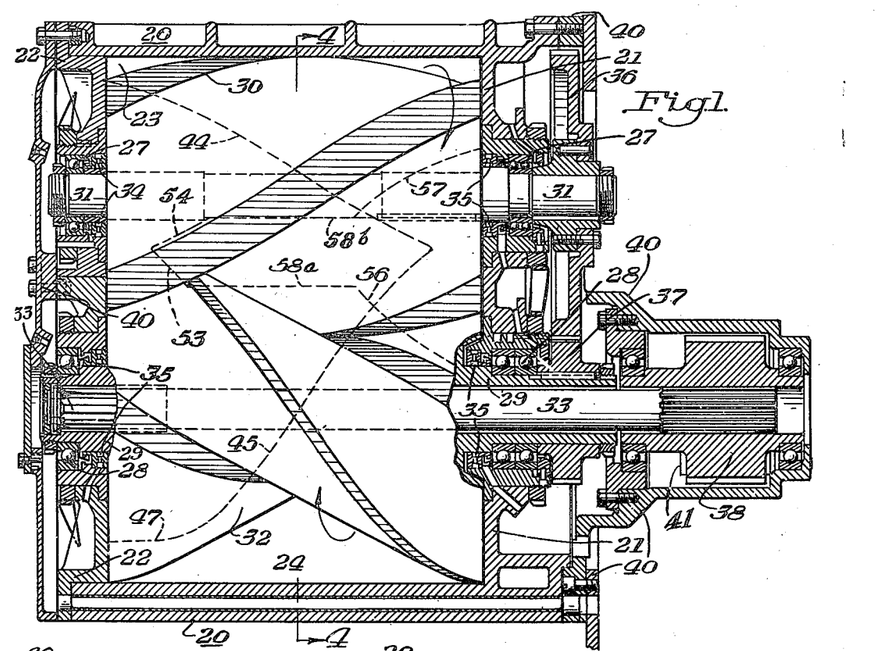
Fig. 1 is a sectional view showing the rotary members of a screw blower assembled in a blower housing with a restricted discharge port outline, a portion of which extends to the ultimate port line.
Figure 2:
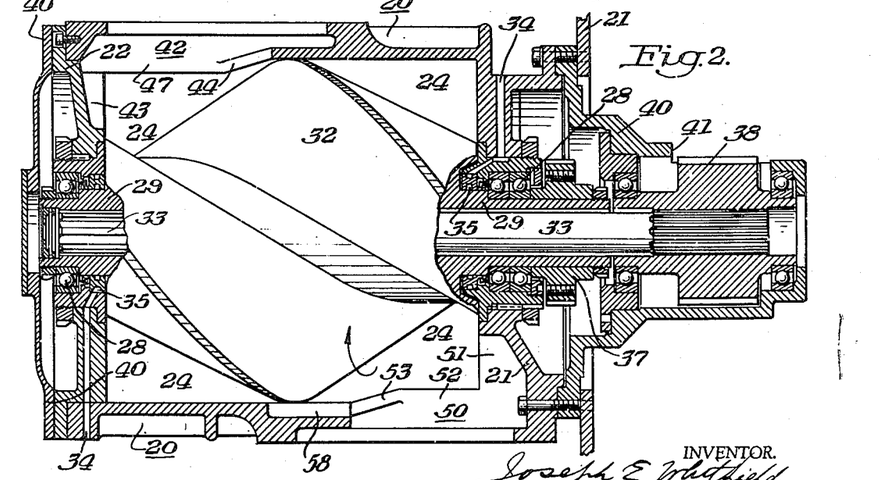
Fig. 2 is a horizontal sectional view taken along the axis of the rotor member in Fig. 1, the section plane being shown along the line 2—2 of Fig. 4.
Figures 3, 4, 5, 6, 7, 8:
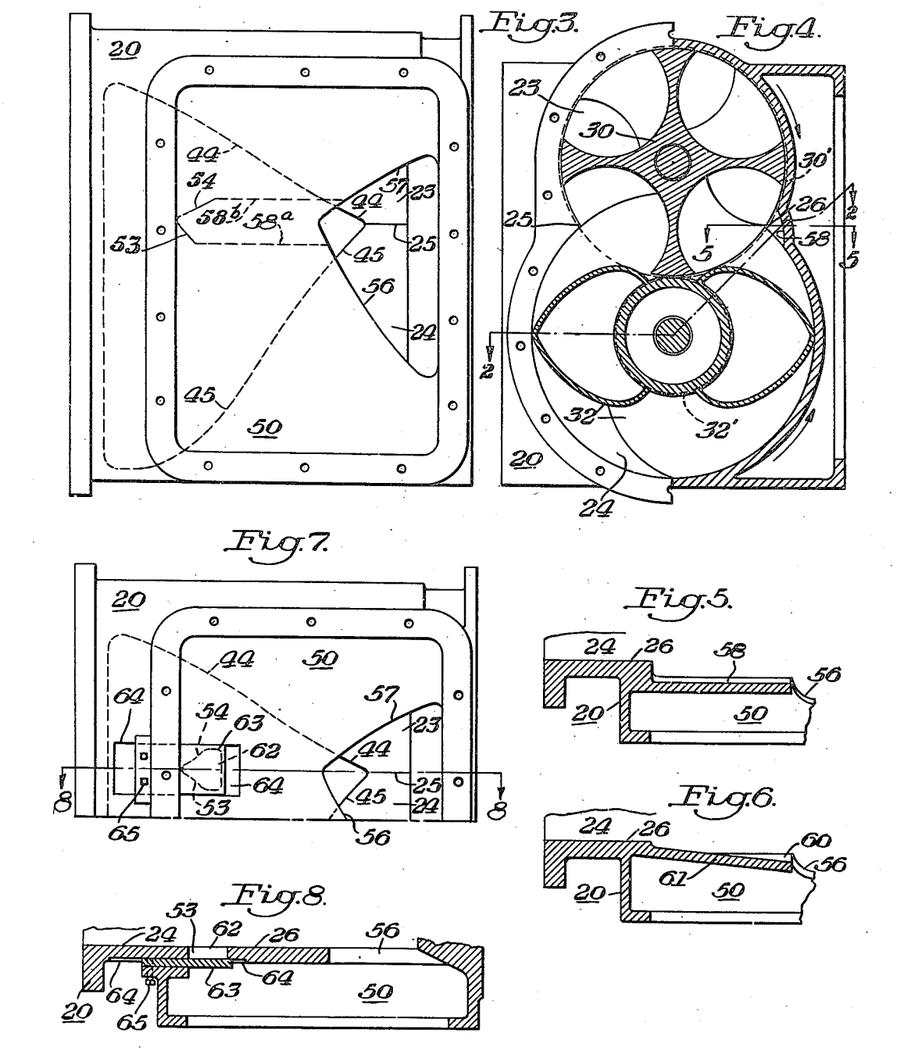
Fig. 3 is a view in side elevation of the blower housing without the rotary members illustrating the discharge port limitations as indicated in Fig. 1.
Fig. 4 is a sectional view taken on the line 4—4 of Fig. 1.
Fig. 5 is a partial sectional view of the housing taken along the line 5—5 of Fig. 4, with parts broken away.
Fig. 6 is a view similar to Fig. 5 showing a modification of the discharge port.
Fig. 7 is a view in side elevation of the blower housing showing an adjustable window port.
Fig. 8 is a partial sectional view taken along the line 8—8 of Fig. 7, with parts broken away.

Referring particularly to Figs. 1 and 2 of the drawings, the housing or case 20 is provided with an integral end wall or head 21 at the right end and a removable end wall or head 22 at the left end. The latter wall may be made in a single section but it is preferable to make it in two parts to simplify the machining operation. The housing is divided into two parallel cylindrical chambers 23 and 24 disposed side by side and merging together forming a large chamber, the cross section of which is in the form of a figure 8. The intersection of the two chambers 23 and 24 forms sharp inwardly extending edges 25 and 26 as shown in Fig. 4 which would normally extend the full length of the chambers but are interrupted or cut away to form the inlet and outlet openings or ports.

The walls 21 and 22 are provided with opposed bearing assemblies 27 and 28 axially aligned with their respective chambers 23 and 24 for supporting the gate member 30 mounted on its shafts 31 and the rotor member 32 mounted on the hollow shaft or sleeve 29 which is splined to the shaft 33.

The gate member 30 is full or all dedendum and the rotor member 32 is full or all addendum. The dotted circle 30' in Fig. 4, which is larger in diameter than the gate threads, represents its pitch circle, while the pitch circle 32' is that of the rotor 32 which is smaller than its root diameter. The rotor member has two threads or teeth while the gate has four, making the ratio one to two. The threads of the rotor extend through substantially 180° while the threads of the gate extend through substantially 90°. The helix angles are uniform through the length of the threads of both members. These rotary members represent the simplest thread form, and the crest edges of the rotor threads generate the adjacent sides of the gate trough while the crest edges of the gate threads generate the arcuate sides of the rotor threads.

The bearing assemblies 27 and 28 are provided with lubricating circuits including passageways, seals and slingers for directing the flow of lubricant therethrough. Inwardly adjacent the lubricant seals the walls 21 and 22 are provided with vents 34 leading from fluid seals 35 around the shafts to the atmosphere for preventing any intercommunication between the fluid under pressure and the lubricating system.

The shafts 31 and 29 extending beyond the bearings in the right end wall 21 have the timing gears 36 and 37 secured thereto, the ratios of which are selected to maintain the gate 30 and the rotor 32 in their proper phase relation. The shaft 33 is splined at one end to the shaft 29 and the other end extends beyond the timing gears and is splined to the pinion 38 which is employed to drive the rotary members when the fluid device is operated as a pump or blower or to drive other mechanism when it is employed as a motor. The gears and the bearing assemblies are covered by the end covers 40 which partially enclose the ends of the fluid device and provide a bearing support for the pinion 38 on the extension of the shaft 33. A small portion of the cover 40 encircling the gear 38 is open as indicated at 41 for the purpose of connecting the meshing gear of an engine or driven member.

The bearing and timing gear assembly is similar to that shown and described in Patent No. 2,287,716 and the manner in which the rotary members 30 and 32 are mounted on their respective shafts is disclosed in application Serial No. 480,792 filed March 27, 1943, now Patent No. 2,442,254 issued May 25, 1948.

The rotary members 30 and 32 are slightly less in diameter than the diameter of their respective cylindrical chambers 24 and 25 in which they operate. The clearance between the rotary members themselves and their running clearance with the cylindrical and end walls of the chambers is sufficient to permit them to freely rotate under an overload with closest possible tolerance that allows for thermal expansion due to the generation of heat in transforming energy and to the temperature of the fluid worked upon.

For the purpose of this disclosure let it be assumed that the fluid device is operated as a pump or blower and the rotor 32 is driven in a counterclockwise direction in the sectional views, such as Fig. 4. The gate 30 is then rotated by the timing gears in a clockwise direction as indicated by the arrows. With the direction of rotation fixed the inlet port 42 becomes located behind the rotary members in Fig. 1 or at the top of Fig. 2, and is defined by a portion of both sections of the end wall 22 and adjacent portions of the cylindrical wall of the chambers 23 and 24. As previously stated the inlet and outlet ports may be made the same so that upon reversal of the direction of rotation of the rotary members the performance characteristics of the pump or blower would be the same. However to simplify the problem the rotation has been fixed and an ultimate inlet port opening 42 is shown. As employed in the specification and claims the term "ultimate port opening" is defined as the largest permissible equal inlet and outlet port openings in the stationary enclosure which can be employed without producing a leakage opening directly between the ports. The ultimate port openings permit the pockets formed by the selected rotary members to open or close for substantially the full outline of the pocket bounded by the threads of the rotary members adjacent the enclosure or housing and each pocket is closed to one port at the same instant that said pocket is opened to the other port. Thus the ultimate port opening 42 follows the indentation or recess 43 in the removable end wall or head 22 and across the cylindrical wall of the chamber 23 following the remote crest edge of the gate member 30 as indicated by the dotted line 44 in Fig. 1 to a point where the remote crest edges of the gate and rotor would theoretically intersect, which is located on the intersection 25. The port line then traces back along the remote crest edge of the rotor down around the cylindrical wall of the chamber 24 to the indentation or recess 43 in the end wall 22, as indicated by the dotted line 45. The remote crest edges of the rotary members as used in the specification and claims are the trailing edges of the perimetral surface of the crests outlining a pocket that is running out.

The outline of the ultimate inlet port 42 is thus represented by the recess 43 in the end wall 22, together with the dotted lines 44, 45 and 47. Each pocket being formed by the threads of the rotary members is sealed to the inlet opening 42 when the leading edges of the crests of the gate and rotor threads reach the port lines 44 and 45 respectively, but just before the point is reached the pocket is open to the inlet 42 for substantially the full outline of the pocket adjacent the enclosure or housing.

Figures 16, 17, 18, 19, 20, 21, 22:
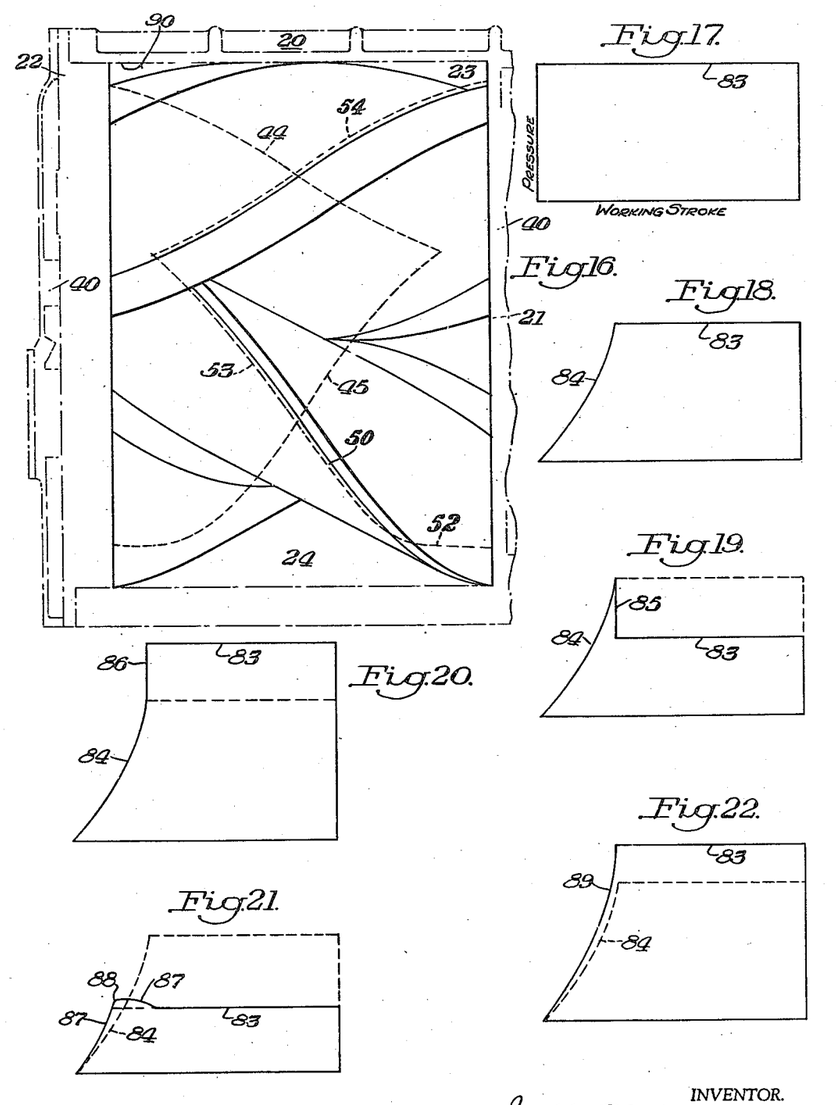
Fig. 16 is a sectional view showing the rotary members mounted in a screw blower having substantially full ultimate port lines shown thereon for the inlet and outlet openings.
Fig. 17 is a diagrammatic view illustrating an indicator card of a blower having ultimate port lines.
Fig. 18 is a view of an indicator diagram of an internal compression blower having resultant port lines that produce an adiabatic pressure equal to the discharge pressure.
Fig. 19 is a view of an indicator diagram showing the pressure differential created when the internal pressure is higher than the discharge pressure.
Fig. 20 is a view similar to Fig. 19 showing the pressure differential created when the internal pressure is lower than the discharge pressure.
Fig. 21 is a view of an indicator diagram of a blower having a balancing channel and working against a low pressure.
Fig. 22 is a view of an indicator diagram of a blower having a balancing channel and working against a high pressure.

Since the ultimate port lines follow the crest edges of the helical threads on the rotor and gate members they are naturally determined by the design of the rotary members selected. With the rotary members disclosed herein the ultimate port just described may be duplicated on the diagonally opposite side of the housing for the ultimate outlet port opening 50 as indicated in Fig. 16. The outline of this ultimate port opening 50 is bounded by the end wall 21 and the dotted line 53 in Fig. 16 which follows the remote crest edge of the rotor thread to the point where it theoretically intersects the remote edge of the crest of the gate thread at the intersection 26. The ultimate port opening then proceeds from this intersection around the cylindrical wall of the chamber 23 as indicated by the dotted line 54 following the remote crest edge of the gate as shown in Fig. 16, thus forming an apex with line 53. To clearly show these port lines in Fig. 16 it may be assumed that the rotor members have been turned slightly and the next adjacent pocket is being opened to discharge.

The ultimate port openings 42 and 50 are so positioned relative to one another that the pockets are closed to one port at the same instant that they open to the other port. Thus the volume of pockets does not diminish between the time that they register successively with the inlet and outlet ports because the inlet port is closed simultaneously with the opening of the outlet port. Since the pockets do not diminish in volume during the interval between registrations with the ultimate inlet and outlet ports no pressure is exerted on the fluid within the pockets and a liquid can be pumped as well as a gas.

One of the principal objects of this invention is to simultaneously open the outlet port 50 as the inlet port 42 closes on the pocket but to reduce the outlet opening to such a degree that the energy required to force the fluid through the restricted outlet creates a pressure in the fluid. If the fluid is discharged from the device against a pressure then it is necessary to reduce the outlet opening to such a degree that the speed of the device and the density of the fluid being discharged through the reduced outlet will increase the pressure of the fluid to equal the discharge pressure. Such a restricted outlet port opening is defined as the selected outlet port opening.

Again, let it be assumed that the fluid being pumped is air and the outlet port 50 is reduced to the selected outlet port opening defined by the limits of the dotted lines 56, 58a, 53, 54, 58b and 57 in Fig. 1. Lines 56 and 57 follow the crest edges of the rotary members in an advanced position, which opening produces a higher pressure than that of an assumed discharge pressure because of the diminishing volume in the pockets from the ultimate port lines 53 and 54 to the reduced port lines 56 and 57. Then as each pocket is uncovered by the port lines 56 and 57 the air rushes out against the discharge pressure, which movement creates a noise, but it would not be as intense as the noise from the discharge pressure moving into the pockets containing low pressure when an ultimate port is employed.

If the blower speed and load is constant the port lines could be positioned along the housing where the pressure in the pocket just uncovered is equal to the discharge pressure and the shape of such an outlet port would prevent the development of additional pressure as the pocket runs completely out. However practical installations are not as simple as this because the speed and load do change and it is necessary to compensate for these changing conditions since the internal pressure varies relative to the discharge pressure. Again the outlet port can be made variable as disclosed in Letters Patent No. 2,287,716 and controlled by the discharge pressure to maintain a balance between the pocket and the discharge pressure, but with both of these methods the variable internal pressure is developed within the moving pockets before they open to the discharge pressure. The greater the difference in pressure between internal pressure and discharge pressure the greater the loss through slip or leakage. To diminish or prevent this loss and regulate this flow the high pressure port lines 56 and 57 are connected to the ultimate port openings 53 and 54 by the balancing channel indicated in Figs. 1 and 3 by the dotted parallel lines 58, which channel is also shown in Figs. 2 and 5. Since the channel 58 extends the selected port opening to the ultimate port opening the fluid in the pockets would flow out immediately before there is any reduction in the volume of the pocket, but the discharge pressure being higher would create a flow through the channel from the discharge into the pocket. The factor governing the direction of flow is then a matter of pressure differential together with the restriction to flow and the speed at which the movement of the pocket disgorges the fluid therein. If the blower is operating at a high speed and the channel 58 is relatively small there will be little or no reverse flow through the channel from discharge to the opening pocket. In this way there is no compression of fluid by reason of the pockets diminishing in volume when closed to the outlet and with the channel providing a restriction of the proper size a liquid can be pumped, which is not true of the automatically balancing pressure device disclosed in the aforementioned patent.

As shown in Figs. 2, 3 and 4 the channel 58 is formed by cutting away a portion of the intersection 26 from the theoretical point where the ultimate port lines 53 and 54 cross to the reduced port opening bounded by the lines 56 and 57. Since the ultimate port line forms the end of the channel 58 there can be no leak-back to the suction port when the crests of the rotary members are uncovered by the inner end of the channel.

In Fig. 6 the channel 60 has a varying cross section owing to the tapered wall 61. Thus the opening is smallest when the pockets are first opened and this opening gradually increases as they advance, thus providing for the flow of a larger quantity of fluid as the pocket is diminishing in volume at a faster rate. The tapered channel 60 will produce different operating characteristics than those obtainable from the use of the channel 58 of uniform cross section.

In Figs. 7 and 8 the channel is replaced by a window port 62 in the walls of cylindrical chambers 23 and 24 which is substantially triangular in shape with the apex formed by the ultimate port lines 53 and 54. This window thus provides an advance port opening similar in size and shape to the inner end of the channel 58. Although the port lines of the window are determined by the ultimate port lines 53 and 54 insofar as the successive pockets are opened to discharge, the restriction is formed by the shutter 63 which is slidably mounted in the track 64 and may be adjusted to provide the full opening of the window port 62 or to the position where it completely closes the same. The shutter 63 may be clamped in the various adjusted positions by means of the set screws 65. If the shutter is closed the window space provides a connection between adjacent pockets for a short period of time as the crests of the threads move under the window. Thus a momentary charge from the discharge pressure would be forced into the next succeeding pocket before it finally opened to the port lines 56 and 57. The size of the window may be increased to increase this momentary charge and prematurely build up the pressure in the pocket before it is finally opened.

However when the shutter 63 is opened the pocket is immediately uncovered by the window port lines 53 and 54 and the pocket remains open through the window until it is finally opened by the final port lines 56 and 57, because the helix angle of the threads on the rotary member permit the pocket to extend from the window to the final port lines. With this form of advanced port opening the orifice may be adjusted independently of the port lines to provide different pressure performance characteristics and when the shutter is open there is no decrease in volume within the pocket before it is opened to the discharge pressure. Here again the speed of the rotors together with the degree of shutter opening and the discharge pressure determine whether there will be a back flow to the pocket as it is initially opened to the window port.

Figure 9:
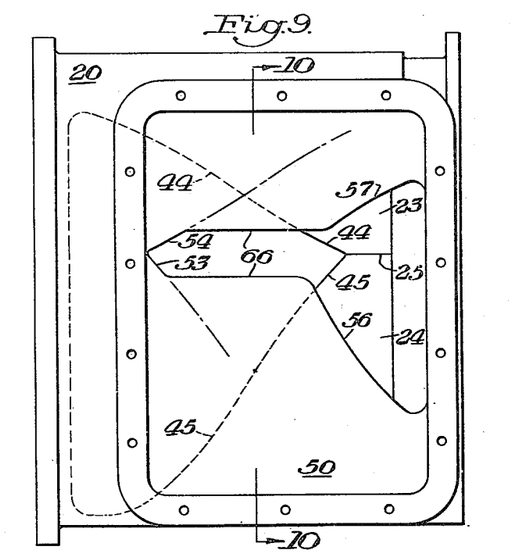
Fig. 9 is a view in side elevation of the blower housing showing a non-variable discharge port opening.
Figure 10:
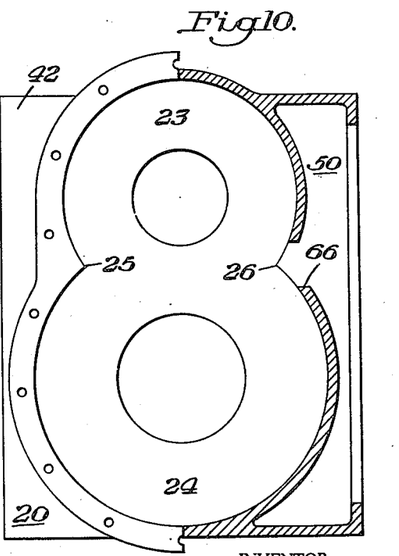
Fig. 10 is a sectional view taken along the line 10—10 of Fig. 9.

In place of having the channel 58 or the window 62 a slot 66 may be cut through the walls of the cylindrical chambers to form a continuation of the final port lines 56 and 57 as shown in Figs. 9 and 10. In this structure the orifice is unrestricted and the pockets are initially opened by the slot 66 and the port opening continues to increase in size as the intersecting threads leading the pocket advance across the housing. This type of port opening is best suited for dense fluids or liquids that are pumped or blown at high operating speeds of the rotor members. The construction of the port outline is such that the threads of the rotary members wipe across the opening to provide a gradual increase in the size of the port.

Figure 11:
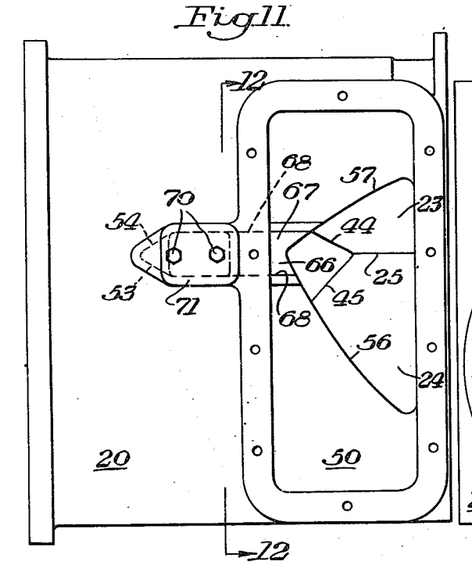
Fig. 11 is a view in side elevation of the blower housing having an adjustable discharge port opening.
Figure 12:
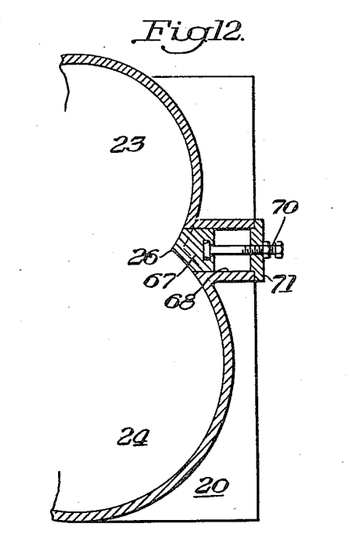
Fig. 12 is a sectional view taken on the line 12—12 of Fig. 11.

In Figs. 11 and 12 the intersection 26 of the cylindrical chambers 23 and 24 is made in the form of a plug 67 the length of which extends from the ultimate port lines 53 and 54 to the final port lines 56 and 57, the ends of the plug taking the respective shape of these port lines. The plug 67 is movable laterally in the slot 68 of the housing by means of the adjusting screws 70 which threadably engage tapered holes in the plate 71 to the left of the outlet 50. The slot 68 is similar to the slot 66 except the left portion which is partially covered by the housing. If the plug 67 is set at its innermost position as shown in Fig. 12 it has the effect of a solid housing and retains the pockets closed until they are uncovered by the selected port lines 56 and 57. In this instance the pockets would decrease in volume between the time they are closed to the ultimate inlet port lines 44 and 45 until they are opened by the selected port lines 56 and 57. However when the plug 67 is withdrawn by the screws 70 from the proximity of the rotary members a channel is formed by the slot 68. This channel is in effect similar to the channel 58 shown in Figs. 3, 4 and 5. Thus by adjusting the position of the plug 67 the slot 68 may be varied in cross section and the pressure characteristics regulated according to the degree of opening of the orifice created by the movement of the plug. The same effect could be obtained by changing the casting of the housing to increase or decrease the channel 58. A portion of the inner surface of the plug 67 could be removed to provide a limiting channel such as shown at 79 in Fig. 14 which may have the shape of the channels shown at 58 and 60 in Figs. 5 and 6 which would permit the pockets to immediately open through the channel when they reached the ultimate port lines 53 and 54 and thus prevent a decrease in the volume of the pockets before they are opened to discharge.

Figure 13:
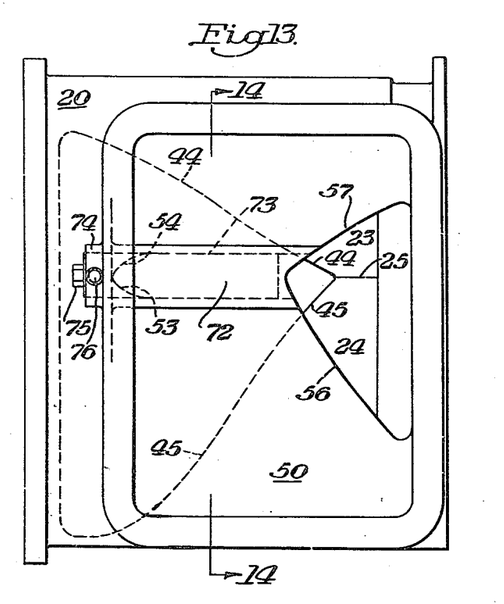
Fig. 13 is a view in side elevation of a blower housing showing a rotary plug for varying the discharge opening.
Figure 14:
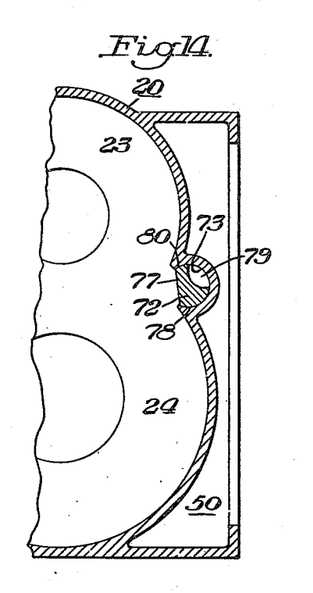
Fig. 14 is a sectional view taken on the line 14—14 of Fig. 13.
Figure 15:
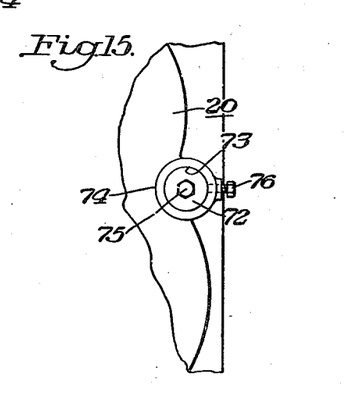
Fig. 15 is an end view of the rotary plug clamping head shown in Fig. 13.

Another form of a variable channel is disclosed in Figs. 13, 14 and 15 wherein the plug 72 is cylindrical in shape and is arranged to be rotatably mounted in the cylindrical chamber or channel 73 which joins the chambers 23 and 24 along the housing 20 from the ultimate port lines 53 and 54 to the selected port lines 56 and 57, taking the place of a considerable length of the intersection 26. Approximately 90° of the plug chamber 73 is open to the rotary members and the outer end of the plug 72 is provided with a cylindrical bearing surface which retains it in position and extends beyond the housing in the form of a cylindrical boss. The plug is inserted into the chamber 73 through the cylindrical bearing 74 at the left side of the port 50. The outer end of the plug 72 is provided with a hexagonal head 75 for receiving a wrench to turn the plug and a radially disposed set screw 76 in the cylindrical boss 74 is employed for securing the plug 72 in its adjusted position.

The plug 72 may have one or more faces formed longitudinally of its length which when turned toward the rotary members produce channels of different cross section. As illustrated in Fig. 14, the flat face 77 on the plug 72 produces a channel of larger cross section than the convex arcuate surface 78, and the concave arcuate surface 79 provides a channel of greater cross section than the flat surface 77. If the plug is set so that the short convex arcuate surface 80 is adjacent the rotor members then the channel is increased by the use of both of the surfaces 77 and 79.

The flat and concave surfaces 77 and 79 on the plug 72 may be tapered to provide a channel of increasing cross section toward the final port lines 56 and 57 in the same manner as that described with reference to the tapered channel 60 in Fig. 6.

Thus by rotating the plug 72 one of a series of channel sizes may be selected. By properly shaping the faces on the plug each channel will produce a different set of performance curves, depending upon the speed of the rotary members and the density and temperature of the fluid. In this manner a family of performance characteristics may be obtained from one pump or blower.

The performance characteristics of a selected blower size may thus be controlled from a condition wherein the pockets are kept closed and create a pressure on the fluid by reduction of the volume of the pockets before they open to the final port lines 56 and 57, as by the use of the plug structure shown in Figs. 11 and 12 to a fully open port structure as indicated by the ultimate port lines 53 and 54 where substantially the whole of the pocket is opened at once. In effect each of the structures disclosed for changing the port openings acts as an orifice the size of which may be changed to obtain different performance characteristics. The channels 58, 68 and 73 can each be made to produce the same performance characteristics as the other or as the window 62 or the slot 66 since the volume of the effective balancing groove is the determining factor. They all have the features in that they connect only a portion of the ultimate port lines 53 and 54 with the final port lines and they differ only in physical form.

The above mentioned patent discloses two intersecting chambers with a rotor member in one chamber and a gate member in the other chamber. However two or more chambers containing gate members in mesh with a single rotor member in a centrally disposed chamber may be employed. Instances of such an arrangement occur in the prior patent art. Again rotor and gate members each having three intermeshing threads and grooves, providing a thread ratio of one to one, may also be employed in the practice of this invention. However as stated in the aforementioned patent a fluid device having rotary members with a thread ratio of two to four, which is also shown herein, is far more practical than one having rotary members with a thread ratio of three to three as the former provides for a larger space or volume for the successively generated pockets. The one to one thread ratio has other limitations.

The study of these fluid devices and especially where they are to be used as blowers may be shown by the use of pressure diagrams representing indicator cards. In dealing with this phase of the disclosure let it be assumed that there is no leakage due to running clearance or heat generated due to compression or other factors which in actual practice occur but complicate the present issues.

The abutments of the rotary members in a blower having ultimate port openings, as shown in Fig. 16, must work against full discharge pressure. The instant that the threads or abutments of the rotary members pass and close the pocket to the inlet opening it is immediately open to discharge. The discharge pressure immediately rushes back into the pocket in which there is no pressure and the full discharge pressure 83 is exerted on the advancing abutments. This expenditure of energy is represented by a full rectangular indicator card as illustrated in Fig. 17 wherein the ordinate is in units of pressure and the abscissa the length of the working stroke. The same character of indicator card represents the conditions of a cross flow blower working against pressure.

If the outlet port is arranged to delay the opening of the pockets to discharge, an internal pressure or compression is developed in the pockets due to their diminishing volume. If the pressure developed in a pocket between its registration with the inlet and outlet ports is equal to the discharge pressure at the instant the pocket is opened to the outlet, there is no reverse flow of fluid due to pressure differential and the blower is operating under the conditions for which it is designed. When the inlet port closes, the internal pressure builds up from zero to the pressure determined by the displacement or reduction in volume caused by the delay in opening the pocket to discharge. When the internal pressure equals the discharge pressure at the time of port opening there is no sudden change in pressure conditions or load on the abutments and the indicator card appears as shown in Fig. 18. The area under the line 84 represents the work expended in building up the internal pressure and the remainder of the area of the card represents the work expended in moving the abutments against the full discharge pressure or moving the abutments defining the trailing end of the pocket up to the ultimate outlet opening as shown in Fig. 18.

In this instance there is no air re-entering the pocket since there is no pressure differential. If the compression of the blower does not match the discharge pressure the pocket pressure and the discharge pressure will not be equal and instantaneous flow to the low pressure position results. This sudden flow produces noise that is undesirable from an audible standpoint as well as efficiency as it represents a loss.

Such a differential pressure condition exists when an internal compression blower with a fixed outlet opening is not operated under the speed and pressure conditions for which it was designed. Again if the blower design is proper any sudden change in the discharge pressure caused by loading or unloading while other conditions are maintained constant, also creates a differential producing the same difficulties causing noise and inefficiency. Thus an internal compression blower must be operated against a constant discharge pressure to prevent noise and inefficiency. Such limitations are not practical when the blower is required to serve a variable load such as required by a Diesel engine for scavenging or supercharging.

If an internal combustion engine operates at a speed of 2000 R. P. M. and at this speed requires 1000 cubic feet of air per minute at a pressure of 16 pounds per square inch which is to be supplied by an internal compression blower driven by the engine, this blower should be designed to deliver the required volume of air at the required pressure. Disregarding thermal and leakage losses, the internal compression blower will always deliver air at 16 pounds pressure regardless of the speed at which it is operated. Let it be assumed that the curve 84 on the pressure indicator diagram shown in Fig. 18 represents the pressure development in each pocket of an internal compression blower having an outlet port which does not release the air from the pocket until it has been compressed to a pressure of 16 pounds. Theoretically the curve 84 then represents the adiabatic pressure of the blower and the area under the adiabatic curve represents the work done in compressing the air in each pocket while the area to the right of the peak of the curve represents the work done in moving the trailing abutments of the pocket against the discharge pressure as previously described.

When the speed of the engine drops off the pressure requirement in the scavenging manifold is also lowered as the air has a longer time in which to pass through the cylinders of the engine so the discharge pressure of the blower is also reduced. However the internal compression blower continues to deliver air at 16 pounds as the speed of the blower has no effect upon its displacement. The indicator card then appears as shown in Fig. 19 wherein the area under the adiabatic curve represents the work of compression and the lower rectangular portion the work of the abutments being moved to the outlet port.

The sudden change in pressure represented by the length of the connecting line 85 in Fig. 19 represents the pressure differential causing instant flow out of the pocket which creates a noise and thus decreases the efficiency of the mechanism.

If on the other hand the speed of the engine were increased and required a scavenging pressure higher than 16 pounds the length of the line 86 on the indicator diagram of Fig. 20 illustrates the pressure differential and the fluid would flow from the manifold into the pocket which is lower in pressure than the manifold or discharge pressure. This sudden change in pressure would also produce noise representing a loss.

As previously explained the balancing groove or channels discussed above permit the fluid to have immediate access to the outlet before the pockets decrease in volume but they restrict the flow of fluid into the pockets and eliminate the noise and loss of efficiency.

Let it be assumed that the resultant selected outlet port lines 56 and 57 shown in Fig. 1 are positioned to produce the dotted adiabatic pressure curve 84 shown in Fig. 21. In other words if the balancing channel were eliminated the internal compression would produce the adiabatic curve 84. Actually the balancing channel creates the pressure curve 87 and the area between the curves 84 and 87 up to the discharge pressure 83 represents the work required to move the fluid from the manifold or discharge through the balancing channel into the pocket as it is diminishing in volume and the area under the curve 87 and above the discharge pressure represents the work required to force the fluid from the pocket to the discharge manifold. The rate of the reduction in volume of the pocket, the size of the balancing channel and the density of the fluid are contributing factors in the production of pressure within the pocket before it is opened by the resultant port outlet. The work expended in moving the fluid from discharge into the pocket is lost but due to the speed and the construction of the balancing channel the flow is least when the pressure differential is least and there is no sudden change in pressure and the noise is eliminated. The overall losses are materially less and the efficiency is higher than that of other types of blowers. Before the leading abutments of the pockets reach the resultant outlet port lines 56 and 57 the balancing chamber is designed to produce a pressure within the pocket that is higher than the discharge or manifold pressure 83 as indicated by the point or knee 88 of the curve 87 in Fig. 21. During the continued advance of the abutments from the point 88 to the selected outlet port lines 56 and 57, air is being discharged from the pocket through the balancing channel and the pressure ultimately is substantially equal to the discharge pressure as shown by the curve 87 approaching the discharge pressure 83.

If the manifold or discharge pressure 83 is greater than that capable of being produced by an internal compression blower having resultant port lines 56 and 57 and the blower is only capable of producing a pressure indicated by the adiabetic curve 84 shown in Fig. 22, then the balancing channel permits the manifold or discharge pressure to force the fluid back through the channel into the pocket for the full stroke, gradually building up a pressure as indicated by the curve 89 which reaches the discharge pressure 83 as the leading abutments reach the resultant port opening defined by the lines 56 and 57.

Upon comparing Figs. 20 and 22, which represent respectively a blower with a balancing channel and one without, it will be noted that under the same conditions the channel prevents the formation of a sudden pressure differential and thus eliminates noise and increases the efficiency of the device. Figs. 21 and 22 represent the upper and lower limits of operation of a blower serving a Diesel engine that varies in speed and requires a changing manifold air pressure and all intermediate characteristics lie between these curves. The flow of fluid through the channel from the manifold into the pockets would be less when the manifold pressure is low as illustrated in Fig. 21 but the speed of operation is decreased, thus giving more time for this flow. In Fig. 22 when the manifold pressure is high it would be assumed that the flow to the pockets is greater but the speed is materially faster so the resultant flow back through the channel may be substantially the same per unit of working stroke as that of the slower speeds, as shown in Fig. 21. These characteristics may be readily changed by constructing the shape of the balancing groove or channel so that it permits the desired back flow under specific pressure and speed conditions. Thus the balancing channel may be of uniform cross section as shown at 58, 66 or 70 or it may expand similar to that shown at 60 or diminish as the abutments approach the resultant outlet by changing the direction of taper of the surfaces on the plugs 72 and 76.

Ordinarily the specific purpose for which these fluid devices are intended require a tailored design so their variations are as numerous as their applications.

An internal compression blower has a constant torque load and the horsepower varies with the speed. When the balancing groove is added both the torque and the horsepower vary with the speed which is ideal for supplying scavenging air to a Diesel engine. By properly designing the blower and the balancing groove, the correct volume of air at the proper manifold pressure may be delivered for any position along the performance curve. Thus each of these points illustrate the numerous advantages of this structure.

In the axial flow type of screw blower as disclosed herein the pockets are initially formed as the end of the lobe of the rotor starts into the trough of the gate at the suction or intake end of the rotary members. This point is approximately 40° ahead of the vertical or full mesh position of the rotor lobe, which point is adjacent the intersection 26 of the cylindrical chambers 23 and 24. The initial pocket is bound by the adjacent trailing surfaces of the rotor lobe and the gate trough and the end wall 22 until the end of the rotor lobe swings out of engagement with the gate trough adjacent the intersection 25 at which time the walls of the cylindrical chambers 23 and 24 help in defining the pocket.

The pocket continues to expand until the end of the same rotor lobe is in its full mesh position in the opposite gate trough. This rotor lobe has rotated approximately one revolution in developing the pocket to its maximum volume. This pocket would be just closed to the ultimate inlet port lines 44 and 45 and just opening to the ultimate outlet port lines 53 and 54 as shown in Fig. 1. In rotating the rotor lobe through approximately an additional revolution this pocket is completely run out. Thus aside from the initial and final rotation of approximately 40°, during which periods the pockets are very small, the lobe must turn through two complete revolutions to generate and run out each pocket. If the rotor has two lobes and the gate four, a pocket is generated or opened to discharge every 180° of rotor movement and four distinct and separate pockets are in different stages of existence at any one time.

I claim:

1. In a fluid device of the character described the combination of a housing having a plurality of parallel cylindrical chambers closed at their ends and which intersect to form a common chamber, a rotary member operable in each cylindrical chamber and having running clearance with the walls of the chambers, the adjacent rotary members being provided with complementary intermeshing helical threads with crests and grooves which cooperate with each other and with the walls of the housing to form fluid sealed pockets that progress from one end of the housing to the other during the rotation of the members, fluid inlet and outlet port openings diagonally disposed from one another in the sides of the housing, the edges of the employed outlet port opening in the side walls of the housing defining a smaller area than the edges of a maximum port outline that opens a pocket at the same instant that said pocket is closed by a maximum inlet port opening for said rotary members, and a balancing passage connecting the employed outlet port opening to the position of said maximum port outline for said rotary members to restrict the flow of fluid from the pockets.

2. The structure of claim 1 which also includes a discharge circuit connected to the employed outlet port opening and containing the fluid medium under pressure, said balancing passage permitting limited communication between the pockets and the discharge circuit to prevent material pressure differential therebetween.

3. In a fluid device of the character described, the combination of a housing having a plurality of closed parallel cylindrical chambers which intersect to form a common chamber, a rotary member operable in each cylindrical chamber and having running clearance with the walls of the chamber, the adjacent rotary members being provided with complementary intermeshing helical threads with crests and grooves which cooperate with each other and with the walls of the housing to form fluid pockets that progress from one end of the housing to the other during the rotation of the members, and diagonally disposed inlet and outlet port openings in the sides of the housing wherein the employed outlet port opening matches a portion of and extends from the defined ultimate outlet port opening in the side wall of the housing toward the end of the housing where the pockets run out which is less in size than the defined ultimate outlet port opening.

4. The structure of claim 3 characterized in that the employed outlet port opening extends from the apex of the defined ultimate port opening toward the end of the housing where the pockets run out.

5. In a fluid device of the character described the combination of a housing having a plurality of closed parallel cylindrical chambers which intersect to form a common chamber, a rotary member operable in each cylindrical chamber and having running clearance with the walls of the chambers, the adjacent rotary members being provided with complementary intermeshing helical threads with crests and grooves which cooperate with each other and with the walls of the housing to form fluid pockets that progress from one end of the housing to the other during the rotation of the members, inlet and outlet port openings diagonally disposed from one another in the sides of the housing, the outline of the outlet port opening being selected to have a material portion that registers with a pocket simultaneously with the closing of said pocket to the inlet port opening and the remaining portion of the outlet port opening coming into registration with said pocket at a later period of rotation of the rotary members.

6. The structure of claim 5 characterized in that said material portion of the selected outlet port opening extends along the ultimate outlet port opening including the apex thereof.

7. The structure of claim 5 characterized in that the outline of the selected outlet port opening is continuous in connecting said material portion and said remaining portion of the outlet port opening.

8. The structure of claim 5 characterized in that the outline of the selected outlet port opening is continuous in connecting said material portion and said remaining portion of the outlet port opening and which also includes means for regulating the effective capacity of the outlet port opening between said material portion and said remaining portion.

9. The structure of claim 5 characterized in that said material portion and said remaining portion of the outlet port opening are independently connected to a common discharge.

10. The structure of claim 5 characterized in that said material portion and said remaining portion of the outlet port opening are independently connected to a common discharge, and which also includes means for regulating the effective connection of said material portion to said common discharge.

11. In a fluid device of the character described the combination of a housing having a plurality of closed parallel cylindrical chambers which intersect to form a common chamber, a rotary member operable in each cylindrical chamber and having running clearance with the walls of the chambers, the adjacent rotary members being provided with complementary intermeshing helical threads with crests and grooves which cooperate with each other and with the walls of the housing to form fluid pockets that progress from one end of the housing to the other during the rotation of the members, inlet and outlet port openings diagonally disposed from one another in the sides of the housing, the outlet port opening including a channel one edge of which registers with a pocket that closes simultaneously with the inlet port opening, said channel connected with a remaining portion of the outlet port opening that comes into registration with said pocket at a later period of rotation of the rotary members.

12. The structure of claim 11 characterized in that said channel is tapered to provide increasing cross section toward said remaining portion of the outlet port opening.

13. The structure of claim 11 which also includes means for regulating the effective cross section of said channel.

14. The structure of claim 11 characterized in that said channel is tapered to provide increasing cross section toward said remaining portion of the outlet port opening, and which also includes means for regulating the effective cross section of the tapering channel.

15. The structure of claim 11 which also includes means for regulating the effective cross section of the initial portion of said channel.

JOSEPH E. WHITFIELD.

REFERENCES CITED

The following references are of record in the file of this patent:

UNITED STATES PATENTS

| Number | Name | Date |
| --- | --- | --- |
| 395,956 | Day | Jan. 8, 1889 |
| 2,095,168 | Burghauser | Oct. 5, 1937 |
| 2,193,671 | Dolza | Mar. 12, 1940 |

FOREIGN PATENTS

| Number | Country | Date |
| --- | --- | --- |
| 384,355 | Great Britain | 1932 |